(12) United States Patent  (10) Patent No.: US 7,721,682 B2
Fulton et al.  (45) Date of Patent: May 25, 2010

(54) SYSTEM FOR PRODUCING A HYDROGEN ENRICHED FUEL

(75) Inventors: Justin Fulton, Fort Collins, CO (US); Roger W. Marmaro, Chandler, AZ (US); Gregory J. Egan, Morristown, NJ (US)

(73) Assignee: Eden Innovations Ltd., Dublin (IE)

( * ) Notice: Subject to any disclaimer, the term of this patent is extended or adjusted under 35 U.S.C. 154(b) by 16 days.

(21) Appl. No.: 12/120,438

(22) Filed: May 14, 2008

(65) Prior Publication Data

US 2008/0216774 A1 Sep. 11, 2008

Related U.S. Application Data

(63) Continuation of application No. 11/348,193, filed on Feb. 6, 2006, now Pat. No. 7,497,191.

(51) Int. Cl.
F02B 43/08 (2006.01)
G06Q 40/00 (2006.01)
(52) U.S. Cl. ............................................. 123/3; 705/37
(58) Field of Classification Search ................... 208/15; 422/242, 224; 141/11, 4; 123/495, 492, 123/299, 575–578, DIG. 12; 705/37
See application file for complete search history.

(56) References Cited

U.S. PATENT DOCUMENTS

| 3,762,428 A | 10/1973 | Beck et al. |
| 4,480,654 A | 11/1984 | Firey |
| 4,520,763 A | 6/1985 | Lynch et al. |
| 4,526,771 A | 7/1985 | Forbush et al. |
| 4,559,133 A | 12/1985 | Siegfried et al. |
| 4,608,830 A | 9/1986 | Peschka et al. |
| 5,139,002 A | 8/1992 | Lynch et al. |
| 5,183,011 A | 2/1993 | Fujii et al. |
| 5,512,787 A | 4/1996 | Dederick |
| 5,516,967 A | 5/1996 | Pandey et al. |
| 5,529,484 A | 6/1996 | Moard et al. |
| 5,558,783 A | 9/1996 | McGuiness |
| 5,660,602 A | 8/1997 | Collier, Jr. et al. |
| 5,666,923 A | 9/1997 | Collier, Jr. et al. |

(Continued)

OTHER PUBLICATIONS

Office Action dated Sep. 25, 2007 from U.S. Appl. No. 11/348,193.

(Continued)

*Primary Examiner*—Stephen K Cronin
*Assistant Examiner*—Keith Coleman
(74) *Attorney, Agent, or Firm*—Stephen A. Gratton

(57) ABSTRACT

A system for producing, dispensing, using and monitoring a hydrogen enriched fuel includes a producing system configured to produce the hydrogen enriched fuel, a vehicle having an engine configured to use the hydrogen enriched fuel, and a dispensing system configured to store and dispense the hydrogen enriched fuel into the vehicle. The system also includes a fuel delivery system on the vehicle configured to deliver the hydrogen enriched fuel to the engine, and a control system configured to control the producing system and to monitor the use of the hydrogen enriched fuel by the vehicle. A method includes the steps of producing hydrogen gas and a hydrocarbon fuel, blending the hydrogen gas and the hydrocarbon fuel into the hydrogen enriched fuel, using the hydrogen enriched fuel in the engine, and tracking emissions during the producing step and during the using step.

25 Claims, 10 Drawing Sheets

U.S. PATENT DOCUMENTS

| | | | |
|---|---|---|---|
| 5,687,776 A * | 11/1997 | Forgash et al. | 141/11 |
| 5,705,771 A | 1/1998 | Flynn et al. | |
| 5,771,857 A | 6/1998 | Willi | |
| 5,787,864 A * | 8/1998 | Collier et al. | 123/492 |
| 5,804,760 A | 9/1998 | Flynn | |
| 5,826,632 A | 10/1998 | Micke et al. | |
| 5,868,133 A | 2/1999 | DeVries | |
| 5,887,567 A | 3/1999 | White et al. | |
| 6,058,713 A | 5/2000 | Bowen et al. | |
| 6,105,631 A | 8/2000 | Pittroff et al. | |
| 6,152,192 A | 11/2000 | Klotz et al. | |
| 6,273,076 B1 | 8/2001 | Beck et al. | |
| 6,311,648 B1 | 11/2001 | Larocque | |
| 6,327,856 B1 | 12/2001 | Iwabuchi et al. | |
| 6,378,308 B1 | 4/2002 | Pfluger | |
| 6,508,209 B1 | 1/2003 | Collier, Jr. | |
| 6,651,623 B1 | 11/2003 | Tang et al. | |
| 6,739,125 B1 | 5/2004 | Mulligan | |
| 6,745,613 B2 | 6/2004 | Rendahl | |
| 6,758,593 B1 | 7/2004 | Terentiev | |
| 6,779,337 B2 | 8/2004 | Tang et al. | |
| 6,823,852 B2 | 11/2004 | Collier, Jr. | |
| 6,827,084 B2 | 12/2004 | Grubb, Jr. | |
| 6,834,508 B2 | 12/2004 | Bradley et al. | |
| 6,901,952 B2 | 6/2005 | Girouard | |
| 6,951,765 B1 | 10/2005 | Gopinath et al. | |
| 7,111,452 B2 | 9/2006 | Miyoshi et al. | |
| 7,168,464 B2 | 1/2007 | Diggins | |
| 7,201,159 B2 | 4/2007 | Veinotte | |
| 7,240,641 B2 | 7/2007 | Balan et al. | |
| 7,497,191 B2 | 3/2009 | Fulton et al. | 123/3 |
| 2003/0051486 A1 | 3/2003 | Ursan et al. | |
| 2003/0177785 A1 | 9/2003 | Kimble et al. | |
| 2003/0209211 A1 | 11/2003 | Collier, Jr. | |
| 2004/0237512 A1 | 12/2004 | Tang et al. | |
| 2004/0244280 A1 | 12/2004 | Waynick | |
| 2005/0016507 A1 | 1/2005 | Tamol, Sr. | |
| 2005/0027592 A1 | 2/2005 | Pettigrew et al. | |
| 2005/0031918 A1 | 2/2005 | Barber et al. | |
| 2005/0188683 A1 | 9/2005 | Miyoshi et al. | |
| 2005/0224045 A1 | 10/2005 | Kuzuyama | |
| 2006/0263283 A1 | 11/2006 | Egan et al. | 423/210 |
| 2007/0039598 A1 | 2/2007 | Wakayama et al. | |
| 2007/0108096 A1 * | 5/2007 | Egan et al. | 208/15 |
| 2007/0181083 A1 | 8/2007 | Fulton et al. | |
| 2007/0277438 A1 | 12/2007 | Lynch et al. | 48/197 |

OTHER PUBLICATIONS

Office Action dated Mar. 21, 2008 from U.S. Appl. No. 11/348,193.
Office Action dated May 23, 2008 from U.S. Appl. No. 11/348,193.
PCT Search Report and Written Opinion in International Application No. PCT/US06/15663 dated Apr. 27, 2007.
Office Action dated Aug. 6, 2008 from U.S. Appl. No. 11/411,766.
Bayse, Leon, Hydrogen Production Costs-A Survey, Dec. 4, 1997, Sentech, Inc.

* cited by examiner

SYSTEM FOR PRODUCING A HYDROGEN ENRICHED FUEL

CROSS REFERENCE TO RELATED APPLICATIONS

This application is a continuation of Ser. No. 11/348,193 filed on Feb. 6, 2006, U.S. Pat. No. 7,497,191. This application is related to Ser. No. 11/411,766 filed on Apr. 26, 2006, Publication no. US-2006-0263283.

FIELD OF THE INVENTION

This invention relates generally to alternative fuels, and particularly to a system and a method for producing, dispensing, using and monitoring a hydrogen enriched fuel.

BACKGROUND OF THE INVENTION

Gaseous alternative fuels, such as hydrogen and natural gas, are valued for their clean burning characteristics in motor vehicle engines. A particularly clean burning gaseous alternative fuel known as HYTHANE is formed from a mixture of hydrogen and natural gas. The prefix "Hy" in HYTHANE is taken from hydrogen. The suffix "thane" in HYTHANE is taken from methane, which is the primary constituent of natural gas. HYTHANE is a registered trademark of Eden Innovations Ltd. HYTHANE typically contains about 5% to 7% hydrogen by energy. Natural gas is typically about 90+% methane, along with small amounts of ethane, propane, higher hydrocarbons, and "inerts" like carbon dioxide or nitrogen.

Hydrogen and methane are complimentary vehicle fuels in many ways. Methane has a relatively narrow flammability range that limits the fuel efficiency in engine applications utilizing a dilute air/fuel mixture and super-aspiration. It is common to dilute the air/fuel mixture with either excess air or recycled exhaust gases, known as lean-burn and exhaust gas recirculation (EGR), respectively. Super-aspiration is commonly achieved with a turbocharger or other supercharging pump. The addition of even a small amount of hydrogen extends the lean flammability range significantly. Methane also has a slow flame speed, especially in lean air/fuel mixtures, while hydrogen has a flame speed about 8 times faster. Methane is a fairly stable molecule that can be difficult to ignite, but hydrogen has an ignition energy requirement about 25 times lower than methane. Finally, methane can be difficult to completely combust in the engine or catalyze in exhaust aftertreatment converters. In contrast, hydrogen is a powerful combustion stimulant for accelerating the methane combustion within an engine, and hydrogen is also a powerful reducing agent for efficient catalysis at lower exhaust temperatures.

Although pure hydrogen fuel can reduce emissions by up to 100%, in the near term there is an objectionable cost differential between fossil fuels and hydrogen. Hydrogen costs are proportional to hydrogen energy, which may be expressed as a percentage of the energy consumed by the baseline energy system (e.g., a non-hydrogen fueled vehicle). However, hydrogen costs alone do not consider the benefits provided by a hydrogen fuel system. To fully understand the benefits of using hydrogen as a fuel, a larger view of the use and economics of hydrogen is necessary.

The present invention considers the reduction in emissions by a hydrogen enriched fuel. The ratio of percent emissions reduction to percent hydrogen energy, relative to baseline conditions, is a measure of the effectiveness of hydrogen utilization called the leverage factor. Hydrogen leverage is defined as the ratio of [% Emissions Reduction]/[% Baseline Energy Supplied as Hydrogen]. For example, a fleet of 100 natural gas buses converted for operation on pure hydrogen, will have a total reduction in emission of about 7%. This means the leverage of using hydrogen is 7%/7%=1. However, the same fleet could use the same amount of hydrogen (7% by energy), blended with natural gas for all 100 buses, and achieve an emissions reduction of 50% for the entire fleet. In this case, the hydrogen leverage is 50%/7%=7.14, or over 7 times as effective as the pure hydrogen case.

The present invention also considers the complete life cycle of the fuel. For example, a biofuel such as ethanol may reduce the emissions produced by a gasoline engine. However, production of the ethanol may include diesel fuel burned in the farm tractors, burning of the agricultural waste, production of excess carbon dioxide during fermentation and distillation, and more diesel burned in tanker trucks for distribution. The present invention recognizes that all of these emission sources must be considered before any valid comparison can be made between the ethanol fuel and the baseline fuel it is replacing.

Despite persistent interest and significant progress in using hydrogen as a vehicle fuel, it has not yet become an established alternative fuel, like alcohols, propane or natural gas. The present invention is directed to a system that utilizes a "wells to wheels" approach, for producing, dispensing, using and monitoring a hydrogen enriched fuel. With the system of the invention, a life cycle assessment can compare the total environmental impact associated with the production, transportation and use of the hydrogen enriched fuel, relative to any other baseline fuel.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

A system and a method for producing, dispensing, using and monitoring a hydrogen enriched fuel are provided. The following embodiments and aspects thereof are described and illustrated in conjunction with a system and method, which are meant to be exemplary and illustrative, not limiting in scope.

The system includes at least one vehicle having an engine configured to use the hydrogen enriched fuel. The system also includes a producing system configured to produce the hydrogen enriched fuel, and a dispensing system configured to dispense the hydrogen enriched fuel into the vehicle. The system also includes a control system configured to monitor emissions and energy consumption by the vehicle during use of the hydrogen enriched fuel. In addition, the control system is configured to monitor and control the production of the hydrogen enriched fuel, and to gather the necessary data for emissions and energy consumption tracking. The control system can also be used to minimize emissions during production and use of the hydrogen enriched fuel, and to minimize energy consumption relative to a baseline fuel.

The producing system includes a hydrogen source configured to provide a hydrogen gas, and a hydrocarbon source configured to provide a base hydrocarbon fuel. The hydrogen gas and the hydrocarbon fuel can be cooled, mixed and compressed by the producing system to provide the hydrogen enriched fuel as a pre-blended pressurized gas or fluid, in a cryogenic, or a supercritical state. Alternately, the producing system can provide the hydrogen gas and the hydrocarbon fuel to the vehicle as separate elements, which can then be mixed on board the vehicle.

The dispensing system, and components of the producing system and the control system as well, can be located at a refueling station similar in structure and function to a conventional gas station. In an illustrative embodiment, the dispensing system is configured to dispense the hydrogen enriched fuel to the vehicle in the pre-blended condition. In an alternate embodiment, the hydrogen gas and the hydrocarbon fuel are provided as separate elements, and the vehicle includes a constant volume injecting system for blending the hydrogen gas and the hydrocarbon fuel.

The method includes the steps of providing a hydrogen enriched fuel, dispensing the hydrogen enriched fuel into the vehicle, using the hydrogen enriched fuel in the vehicle engine, and monitoring emissions and fuel consumption at least during the using step. The monitoring step can sense and record engine performance data, such as engine operating conditions, exhaust emission data, and mileage data. The monitoring step can also monitor data to estimate and track the emissions over the entire life cycle of the hydrogen enriched fuel including during producing, dispensing and using of the hydrogen enriched fuel. In addition, the monitoring step can certify the condition of the hydrogen enriched fuel and provide safety and control during producing, dispensing and using of the hydrogen enriched fuel.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

DETAILED DESCRIPTION OF THE PREFERRED EMBODIMENTS

The following definitions are used in the present disclosure.

HYTHANE means a hydrogen enriched fuel which includes hydrogen and methane (natural gas).

Supercritical cryogenic fuel (SCCF) means a hydrogen enriched fuel which includes hydrogen gas dissolved in a supercritical hydrocarbon fluid.

Supercritical fluid means a fluid at a pressure and temperature which are above the critical temperature and pressure of the fluid. In this state, there is no differentiation between the liquid and gas phases, and the fluid is referred to as a dense gas in which the saturated vapor and saturated liquid states are identical.

Greenhouse emissions mean emissions to the atmosphere which contribute to the greenhouse effect and global warming.

System 10

Figure 1:
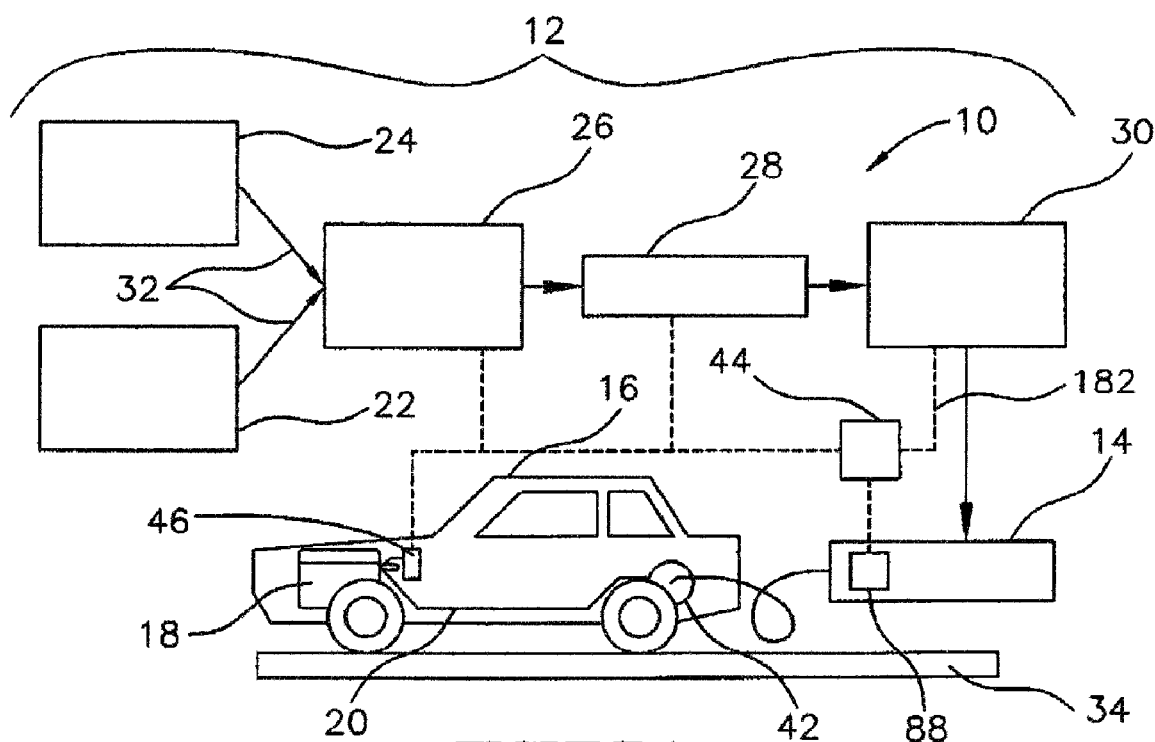
FIG. 1 is a schematic drawing of a system for producing, dispensing, using and monitoring a hydrogen enriched fuel.

Referring to FIG. 1, a system 10 for producing, dispensing, using and monitoring a hydrogen enriched fuel are illustrated. The system 10 includes a producing system 12 for producing the hydrogen enriched fuel, a dispensing system 14 for dispensing the hydrogen enriched fuel, and a vehicle 16 having an engine 18 configured to use the hydrogen enriched fuel. The vehicle also includes a fuel delivery system 20 for the engine 18 and an engine control module 46.

The system 10 (FIG. 1) also includes a master control system 44 in signal communication via communication lines 182 with the engine control module 46 on the vehicle 16, with an audit and control module 88 of the dispensing system 14, and with components of the producing system 12. The master control system 44 is configured to sense, retrieve, store and communicate vehicle specific data, particularly exhaust emission data (or operating data which can be used to estimate emissions) and vehicle mileage data. This data can be used to adjust or re-configure particular vehicles 16 for reducing emissions and reducing energy consumption. This data can also be used to provide an accounting of the reduction of global warming gases for the carbon credit system of the 1997 Kyoto Protocol. Rather than just vehicle emissions, the master control system 44 can also be used to monitor emissions over the entire life cycle of the hydrogen enriched fuel including emissions produced by components of the producing system 12. The master control system 44 can also be configured to monitor and certify the condition of the hydrogen enriched fuel produced by the producing system 12, and to provide safety and control for the producing system 12, the dispensing system 14 and the vehicle 16.

In the illustrative embodiment, the hydrogen enriched fuel comprises HYTHANE, which includes hydrogen gas blended in a methane fuel. In addition, the methane fuel can be in the form of a compressed gas (CNG), a liquid natural gas (LNG) or a supercritical fluid. However, rather than a methane fuel, the hydrogen enriched fuel can include other hydrocarbon fuels, such as ethylene, ethane, propane, propylene, propene, and butane. As another alternative, the hydrogen enriched fuel can include multiple hydrocarbons, such as methane combined with higher hydrocarbons such as ethylene, ethane, propane, propylene, propene, and butane. Further, the hydrogen enriched fuel can include additives configured to improve physical or performance characteristics.

Producing System 12

As shown in FIG. 1, the producing system 12 includes a hydrogen source 22 and a methane (natural gas) source 24. The producing system 12 also includes a blending system 26 for blending the hydrogen and the methane (natural gas) into HYTHANE at a common temperature. A representative range for the temperature can be from 40° C. to 125° C. The blending system 26 also includes a compressor system 28 for compressing the HYTHANE to a selected pressure. A representative range for the selected pressure can be from 2000 psig to 5000 psig for useful vehicle storage.

The blending system 26 (FIG. 1) can be located at a refueling station 34 (FIG. 1) similar in structure and function to a conventional gas service station. Alternately, the blending system 26 (FIG. 1) can be located at another location, and the pre-blended HYTHANE transported to the refueling station 34 (FIG. 1). The producing system 12 (FIG. 1) also includes a fuel transportation system 32 (FIG. 1) for transporting hydrogen from the hydrogen source 22, and methane from the methane (natural gas) source 24 to the blending system 26. The producing system 12 (FIG. 1) also includes a storage system 30 (FIG. 1) in the form of a cascade of storage tanks located at the refueling station 34 (FIG. 1). At least the final stage of the cascade is kept at a significantly higher pressure than the maximum pressure of the vehicle fuel tank 42 (FIG. 1), in order to dispense fuel quickly from the dispensing system 14 (FIG. 1) into the vehicle fuel tank 42 (FIG. 1). Without high pressure storage, only slow-fill dispensing is possible, which is not practical for large fleets of high-utilization vehicles.

Hydrogen Source 22

The hydrogen source 22 (FIG. 1) is selected and operated to minimize emissions and energy consumption during hydrogen production. There are many possible hydrogen sources, and the choice can have a large effect on the overall environmental impact of the system 10 (FIG. 1). Suitable hydrogen sources include electrolysis, exotic water splitting, industrial waste streams, wells, reforming, and gasification.

Electrolysis—Hydrogen Source 22

Electrolysis is a process for splitting the water molecule into its constituent hydrogen and oxygen using electrical power input. Electrolysis of water may use electricity from renewable energy like wind power or solar photovoltaic cells or from the common electrical energy grid.

While electrolysis can be convenient for producing hydrogen in any location where water and electricity are available, the equipment can be expensive. In addition, the cost of the hydrogen produced by electrolysis is usually more expensive than other sources, depending on the cost of the electrical input power. One feature makes electrolysis special when compared to other hydrogen production methods: it is possible to electrolyze water at high pressures, and the overvoltage required to produce pressurized hydrogen is almost thermodynamically perfect. From an efficiency standpoint, high-pressure electrolysis is perhaps the best way to produce pressurized hydrogen. Since electrolysis uses relatively expensive electrical power and equipment, 'high efficiency' doesn't always mean 'low cost,' however.

Exotic Water Splitting—Hydrogen Source 22

More exotic methods for splitting water have been demonstrated, but are not in common use at the moment. These methods include nuclear thermo-chemical, photolytic, and microbial or electrically assisted microbial processes.

Industrial Waste Stream—Hydrogen Source 22

From an environmental point of view, the next best thing to the hydrogen produced by certain renewable electrolysis processes would be the utilization of an industrial waste stream with significant hydrogen content. Industrial waste can also be the lowest-cost source of hydrogen in many cases. Steel and secondary aluminum production, chlorine/alkaline plants, glass factories, paper mills, and sometimes oil or gas refineries produce hydrogen-rich waste gas streams. There are many proven industrial techniques for separating hydrogen, which are facilitated by the many characteristics of hydrogen that make it unique among other gases.

HYTHANE is not particularly sensitive to the final purity of the hydrogen source. Parts-per-million levels of contaminants typically found in hydrogen waste streams, like carbon monoxide, for instance, can permanently damage fuel cells. However, an engine fuelled by HYTHANE will not be significantly affected by carbon monoxide mixed with the hydrogen and natural gas up to several percent. In fact, carbon monoxide has a wide flammability range similar to hydrogen, and the characteristic combustion delay of carbon monoxide is accelerated by the presence and combustion of hydrogen. Other gases that do not permanently contaminate and damage a fuel cell can still impair performance while present in the hydrogen supply stream, like nitrogen, carbon dioxide, methane, etc. Most of these constituents are common in the various gases found in natural gas, so again, a HYTHANE engine is very robust when it comes to fuel quality. In addition, there is a huge capital and energy cost difference between hydrogen separation equipment that produces 90+% hydrogen for HYTHANE versus equipment that produces the 99.9999+% purity necessary for fuel cells.

Wells (Natural Deposits)—Hydrogen Source 22

Although it is not common, there are certain natural gas deposits with a relatively high concentration of hydrogen occurring naturally. While too much hydrogen can be a problem for typical heating equipment set up for pipeline natural gas supply, the hydrogen removed from these sources can be used further downstream for vehicle refueling. If a natural hydrogen-rich gas deposit happens to be at the right location, it may even be possible to use dedicated pipelines from the well and fuel conditioning plant to HYTHANE vehicle refueling stations.

Reforming and Gasification—Hydrogen Source 22

The majority of the commercial hydrogen available today is made from the high temperature chemical reaction of natural gas and water, called steam reformation. This process produces carbon dioxide and consumes some of the fuel energy of the original natural gas feedstock. So, from a life cycle perspective, this is not the best choice of hydrogen for energy efficiency or greenhouse gas emissions. However, steam reformed natural gas is generally the lowest-cost source of hydrogen, and the process is scaleable from huge oil refinery size plants down to on-site units for HYTHANE dispensing systems. Only a natural gas source and water (and a small amount of electrical power for control) are needed to produce relatively low-cost hydrogen at new or existing natural gas refueling facilities where other sources of hydrogen may be too expensive or are otherwise unavailable.

Hydrogen is also produced by the partial oxidation of various feedstocks, including biomass or coal, a process generally referred to as gasification. The product stream from the partial oxidation step includes hydrogen and carbon monoxide, along with water vapor, carbon dioxide, and nitrogen. The heat produced by the partial oxidation can be used with additional steam injection to create more hydrogen and carbon dioxide from the endothermic reaction of water and carbon monoxide (the autothermal water gas shift process).

Methane (Natural Gas) Source 24

Like the hydrogen source 22, the choice of the methane (natural gas) source 24 for HYTHANE can have a significant impact on the life cycle assessment of the system emissions. As with the hydrogen source 22 the methane (natural gas) source 24 is selected and operated to minimize emissions and energy consumption. Suitable methane (natural gas) sources 24 include wells, industrial waste streams, and biogas.

Wells (Natural Deposits)—Methane (Natural Gas) Source 24

Almost all of the methane in the world's energy networks comes from natural "fossil fuel" deposits. These sources are the most widespread and provide the least expensive methane for industrial or vehicular use. This source also takes a sequestered form of carbon and eventually puts it back into the atmosphere as greenhouse gas, so the environmental impact of this source must be considered. Life cycle emissions of fossil natural gas can still compare favorably against other fuels with more energy-intense production processes or higher carbon concentrations, like gasoline for instance.

In the future, huge ocean deposits of icy natural gas hydrate (NGH) compounds may provide a significant source of methane. The total methane energy contained within and under these hydrate formations is estimated to be at least double the known underground oil and gas reserves of the world. Many countries with no underground natural gas could take advantage of this underwater resource. The environmental impacts of this source would be similar to underground methane; however, there is more risk of methane being released to the atmosphere due to the semi-stable nature of many methane hydrate formations. Methane is a powerful greenhouse gas—its effect on global warming is similar to 21 times as much carbon dioxide by weight over a 100-year period.

Industrial Waste Stream—Methane (Natural Gas) Source 24

Methane-rich waste streams are common in many industries, such as coal mining and the production of oil, chemicals, and steel. Capturing, separating, and compressing these methane sources for pipeline transportation is not always economical compared to conventional natural gas production from wells. In many cases, industrial processes vent or flare (burn) waste methane because it not economical to compress or liquefy the gas for transportation. In addition, remote sites like offshore oil production facilities may not even have the option of pipeline transportation. Here again, natural gas hydrates may provide an effective method for these stranded methane sources to be captured without the equipment and energy expenses of methane compression or liquefaction, but NGH production technology is not fully developed at this time.

Biogas—Methane (Natural Gas) Source 24

Similar to industrial waste streams of methane, various sources of methane-rich 'biogas' are common but not necessarily economical to capture and transport when compared with fossil natural gas production. Global warming concerns and the carbon credit trading market created by the Kyoto Protocol may justify more widespread utilization of these sources. Some of the more easily captured biogas emissions come from landfills and wastewater treatment plants. Another potential source is larger livestock management facilities with liquid waste management systems, similar to domestic wastewater treatment systems.

Fuel Transportation System 32

Suitable fuel transportation systems 22 include pipelines, ships and trucks. As with the hydrogen source 22 and the methane (natural gas) source 24, the transportation system 22 is selected and operated to minimize emissions and energy consumption.

Pipeline—Fuel Transportation System 32

For methane in the form of natural gas one suitable transportation method is through pipeline networks. Although moderately high-pressure pipelines are occasionally available, the majority of natural gas dispensing systems are supplied by low-pressure pipeline gas.

It is also possible to transport and distribute hydrogen through pipelines. Many of the earliest gas pipeline networks were developed in cities using 'town gas' for heating and lighting. This gas was a mixture of hydrogen and carbon monoxide produced by steam reformation of coal. In addition, hydrogen pipelines are common in and between oil refineries and chemical plants.

Liquefaction and Ship/Truck—Fuel Transportation System 32

For isolated island or coastal countries, imported liquefied natural gas (LNG) is sometimes the sole natural gas resource available. However, LNG may be economically imported to countries with developed domestic natural gas resources due to lower production costs overseas. The natural gas is liquefied in a refrigeration cycle that reduces the temperature to about −160° C., thereby reducing the volume of the methane by a factor of about 600 at atmospheric pressure. This reduction in volume allows huge quantities to be shipped by special tankers over the ocean, or by super-insulated tanks on rail cars or over-the-road trailers. On large industrial scales, the liquefaction process consumes roughly 15% of the natural gas energy.

Hydrogen may also be transported as a cryogenic liquid, but at the much lower temperature of −253° C. at atmospheric pressure. The liquefaction process consumes approximately 30% of the fuel energy of the liquid hydrogen. Liquid transportation of hydrogen with tanks on rail cars or on-highway trailers is relatively common up to distances of about 1600 km, but large-scale ocean shipping is not utilized for hydrogen distribution. Large consumers of hydrogen have dedicated production facilities, either on-site or through pipeline transportation.

It is also possible to transport a pre-blended, supercritical mixture of LNG and hydrogen. The supercritical mixture has density similar to LNG, but it behaves more like a gas, remaining well mixed, in a single state without a liquid/gas interface surface, and completely filling the tank without splashing or sloshing.

Natural Gas Hydrate and Ship/Truck—Fuel Transportation System 32

The hydrated form of natural gas is not currently used for transportation. However, NGH contains up to 13.4% methane by weight at a density of about 0.9 g/ml. This implies a methane storage density equivalent to 17 MPa of pressure, or about 2480 psi. To ensure long-term stability of the hydrate, an actual pressure of only about 2.5 MPa (360 psi) and a storage temperature of −5° C. are all that is required. Meta-stability and relatively slow dissociation allows storage of NGH at atmospheric pressure and −5° C. temporarily—for days of transportation time, for instance.

One transportation and distribution process pumps an NGH slurry to pipeline pressures and heats to cause dissociation, similar to the process used for putting vaporized LNG into a pipeline. However, the liquid water left from the dissociated hydrate must then be separated from the pressurized gas stream.

Compression and Truck—Fuel Transportation System 32

For short distances up to about 300 km over land, natural gas and hydrogen can be economically transported as a compressed gas by highway and rail in DOT specification cylinders, highway cargo tanks and tube trailers, and rail tank cars. Tube trailers may be an attractive solution for distribution of hydrogen to HYTHANE refueling stations serving smaller fleets. In addition, tube trailers or rail tanks may distribute HYTHANE blended and compressed at a central facility to nearby refueling stations that do not have convenient natural gas pipeline availability.

Blending System 26

Figure 2:
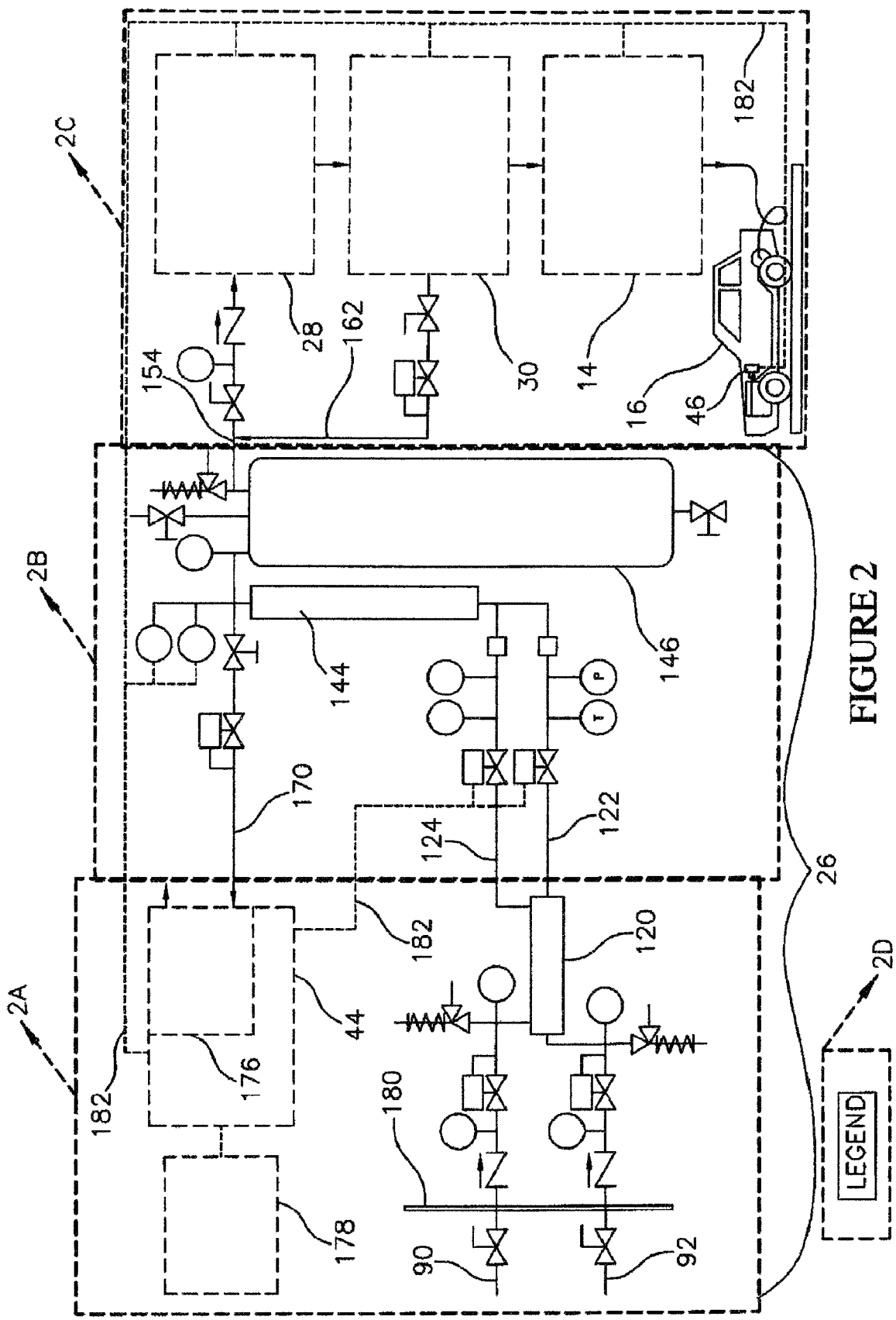
FIG. 2 is a schematic diagram showing a blending system, a compressing system, a storage system and a dispensing system of the system.
Figure 2A:
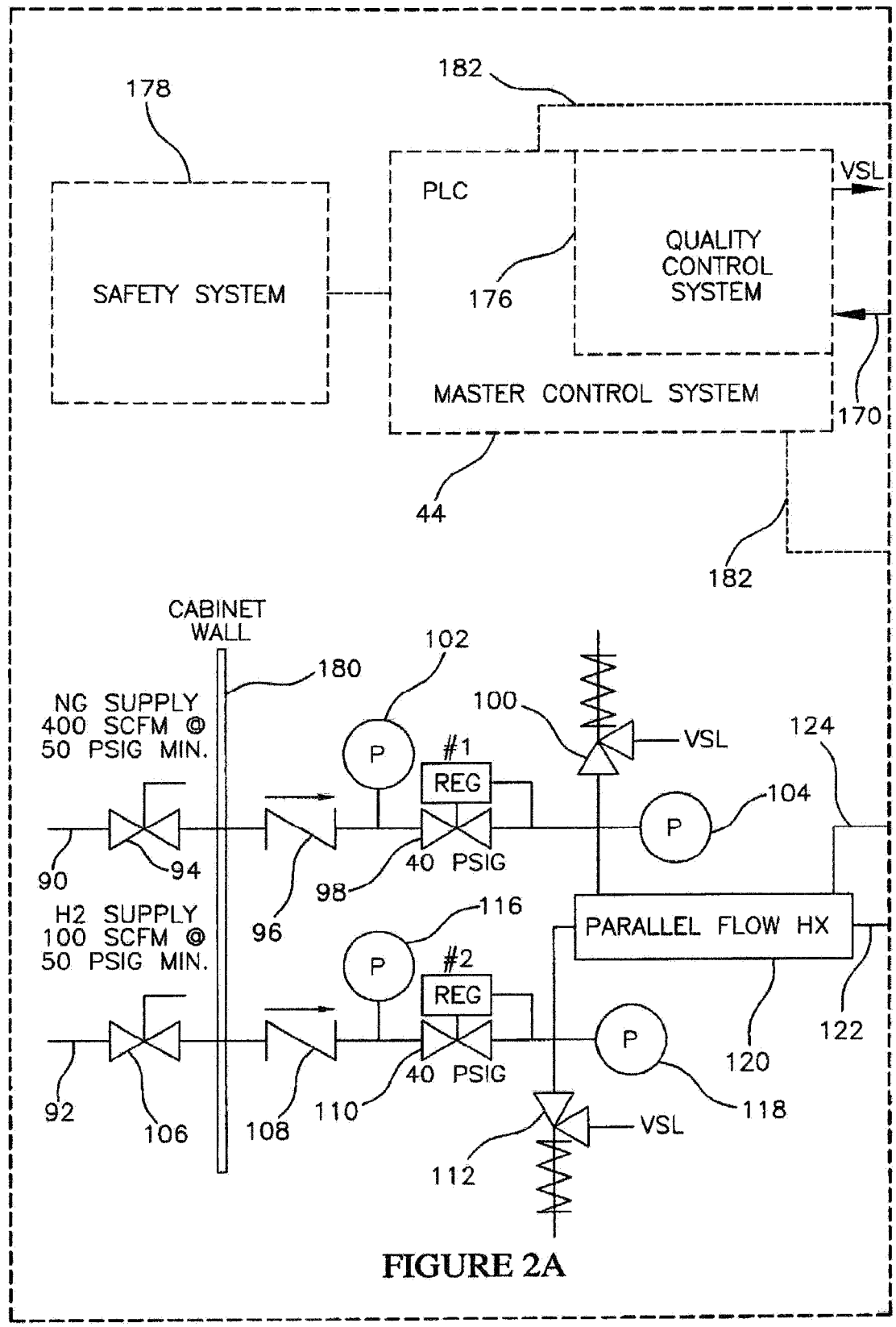
FIG. 2A is an enlarged view of FIG. 2 taken along line 2A.
Figure 2B:
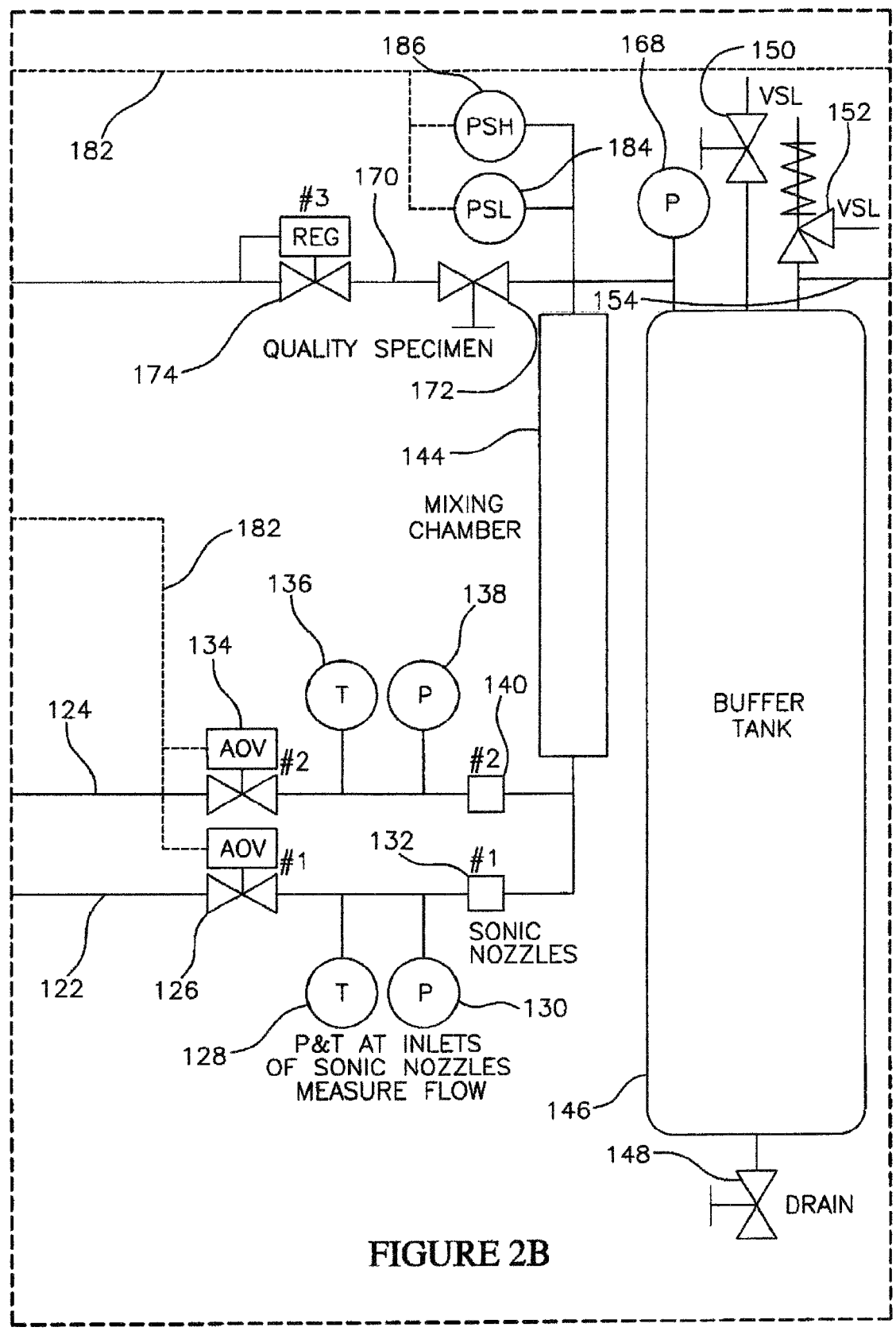
FIG. 2B is an enlarged view of FIG. 2 taken along line 2B.
Figure 2C:
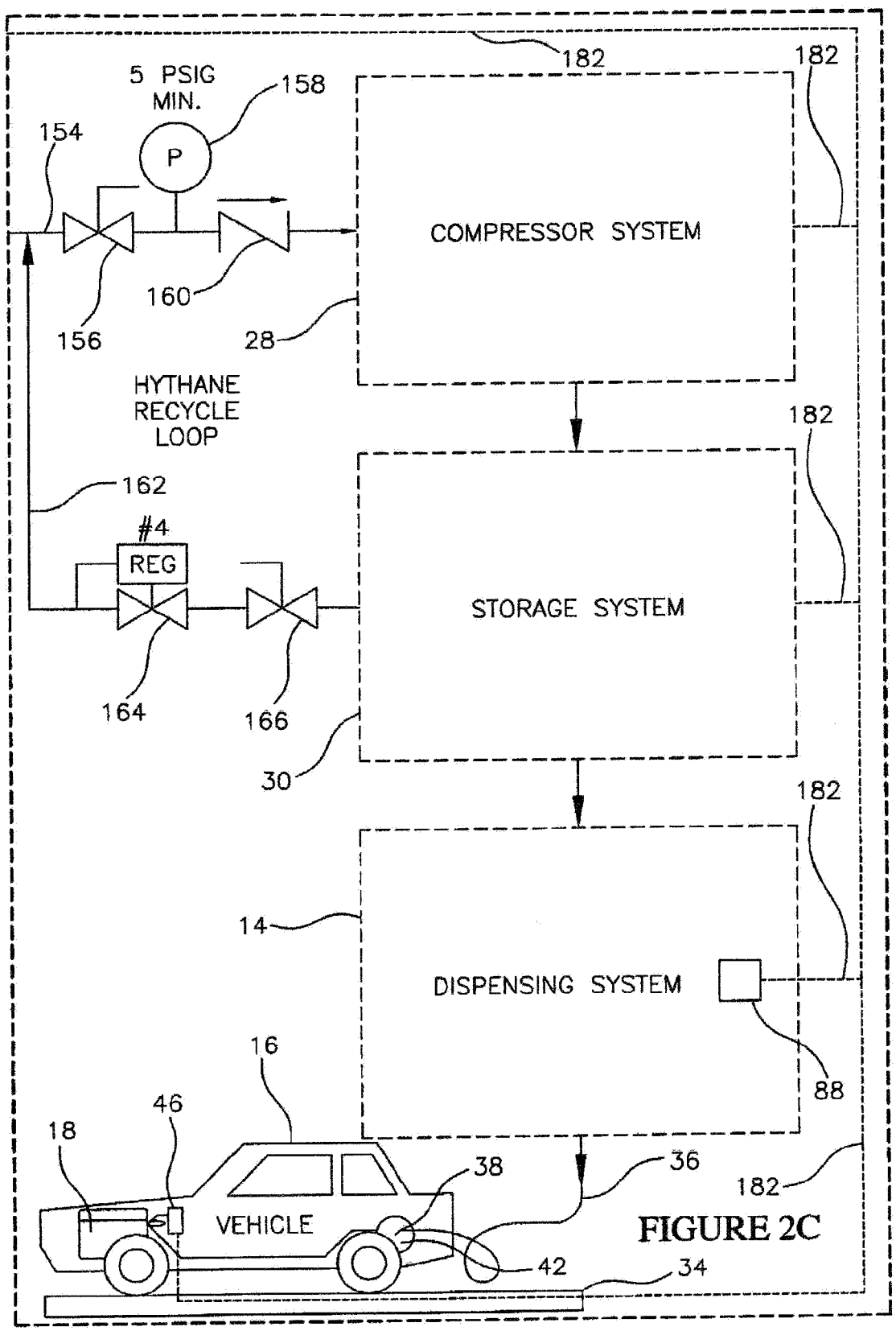
FIG. 2C is an enlarged view of FIG. 2 taken along line 2C.
Figure 2D:
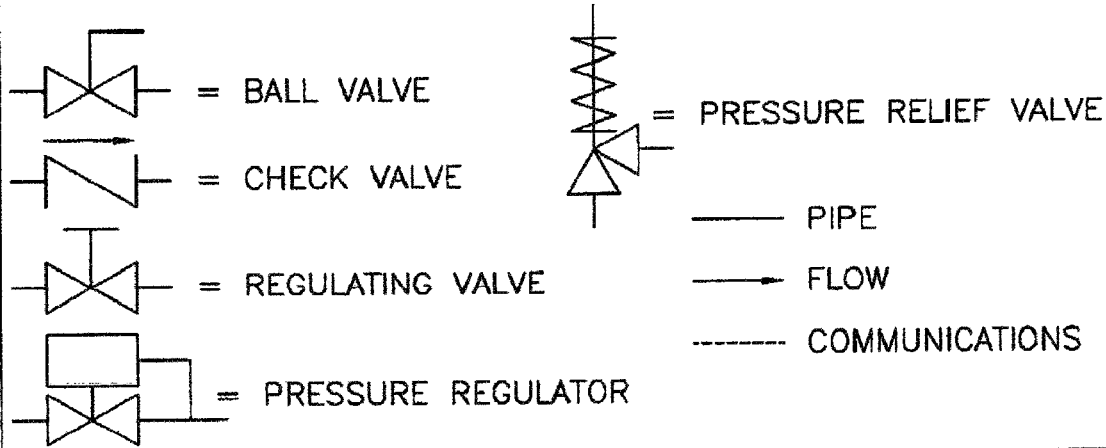
FIG. 2D is an enlarged view of FIG. 2 taken along line 2D.

Referring to FIGS. 2-2D, further details of the blending system 26, and its' interface with the producing system 12 and the dispensing system 14 are illustrated in schematic form. With respect to FIGS. 2-2D, FIG. 2 illustrates the complete blending system 26, FIGS. 2A-2C, are enlarged portions of FIG. 2, and FIG. 2D contains the legend from FIGS. 2-2C.

The blending system 26 (FIG. 2) includes a methane (natural gas) conduit 90 (FIG. 2A) and a hydrogen gas conduit 92 (FIG. 2A). A representative flow rate for the methane (natural gas) conduit 90 (FIG. 2A) can be about 400 SCFM at a minimum pressure of 50 psig. A representative flow rate for the hydrogen gas conduit 92 (FIG. 2A) can be about 100 SCFM at a minimum pressure of 50 psig. The size of the methane (natural gas) conduit 90 (FIG. 2A) can be selected as required with a 3 inch conduit being representative. The size of the hydrogen gas conduit 92 (FIG. 2A) can also be selected as required with a 1 inch conduit being representative.

The methane (natural gas) conduit 90 (FIG. 2A) is in flow communication with a ball valve 94 (FIG. 2A), a check valve 96 (FIG. 2A), a pressure regulator 98 (FIG. 2A) and a pressure relief valve 100 (FIG. 2A). A cabinet wall 180 can be located between the ball valve 94 (FIG. 2A) and the check valve 96 (FIG. 2A). In addition, pressure gauges 102, 104 (FIG. 2A) sense pressure on either side of the pressure regulator 98 (FIG. 2A). The hydrogen gas conduit 92 (FIG. 2A) is in flow communication with a ball valve 106 (FIG. 2A), a check valve 108 (FIG. 2A), a pressure regulator 110 (FIG. 2A) and a pressure relief valve 112 (FIG. 2A). The cabinet wall 180 separates the ball valve 106 (FIG. 2A) and the check valve 108 (FIG. 2A). In addition, pressure gauges 116, 118 (FIG. 2A) sense pressure on either side of the pressure regulator 110 (FIG. 2A).

The methane (natural gas) conduit 90 (FIG. 2A) and the hydrogen gas conduit 92 (FIG. 2A) are also in flow communication with a parallel flow heat exchanger 120 (FIG. 2A) configured to cool the methane (natural gas) and the hydrogen to a common temperature. A methane (natural gas) output conduit 122 (FIGS. 2A and 2B) of the parallel flow heat exchanger 120 (FIG. 2A) includes an air operated valve 126 (FIG. 2B), a temperature gauge 128 (FIG. 2B), a pressure gauge 130 (FIG. 2B) and a sonic nozzle 132 (FIG. 2B). A hydrogen gas output conduit 124 (FIGS. 2A and 2B) of the parallel flow heat exchanger 120 (FIG. 2A) includes an air operated valve 134 (FIG. 2B), a temperature gauge 136 (FIG. 2B), a pressure gauge 138 (FIG. 2B) and a sonic nozzle 140 (FIG. 2B). The air operated valves 126, 134 (FIG. 2B) are in signal communication via communications lines 182 (FIG. 2B) with the master control system 44 (FIG. 2A) and with a quality control system 176 (FIG. 2A) of the master control system 44 (FIG. 2A).

The methane (natural gas) output conduit 122 (FIG. 2B) and the hydrogen gas output conduit 124 (FIG. 2B) of the parallel flow heat exchanger 120 (FIG. 2A) are also in flow communication with a mixing chamber 144 (FIG. 2B) wherein the methane (natural gas) and the hydrogen gas are mixed to form the hydrogen enriched fuel. The mixing chamber 144 (FIG. 2B) includes a pressure switch (low) 184 (FIG. 2B) and a pressure switch (high) 186 in signal communication via communications lines 182 with the master control system 44 (FIG. 2A). The pressure switches 184, 186 (FIG. 2B) can be used to control flow into and out of the mixing chamber 144 (FIG. 2B). The mixing chamber 144 (FIG. 2B) is also in flow communication with a buffer tank 146 (FIG. 2B) wherein the hydrogen enriched fuel is collected and temporarily stored. The buffer tank 146 (FIG. 2B) includes a pressure gauge 168 (FIG. 2B), a drain valve 148 (FIG. 2B), a regulating valve 150 (FIG. 2B), and a pressure relief valve 152 (FIG. 2B) configured to vent to a safe location such as a vent stack.

An output conduit 154 (FIGS. 2B and 2C) of the buffer tank 146 (FIG. 2B) includes a ball valve 156 (FIG. 2C), a pressure gauge 158 (FIG. 2C) and a check valve 160 (FIG. 2C) in flow communication with the compressor system 28 (FIG. 2C). The compressor system 28 (FIG. 2C) is configured to pressurize the hydrogen enriched fuel to a selected pressure. The compressor system 28 (FIG. 2C) in turn is in flow communication with the storage system 30 (FIG. 2C), which is configured to store a selected quantity of the hydrogen enriched fuel at the selected pressure. The storage system 30 (FIG. 2C) is also in flow communication with the dispensing system 14 (FIG. 2C). In addition, a HYTHANE recycle loop 162 (FIG. 2C) is in flow communication with the storage system 30 (FIG. 2C) and with the output conduit 154 (FIG. 2C) from the buffer tank 146 (FIG. 2B). The HYTHANE recycle loop 162 (FIG. 2C) includes a pressure regulator 164 (FIG. 2C) and a ball valve 166 (FIG. 2C).

Communication lines 182 (FIG. 2C) establish signal communication between the master control system 44 (FIG. 2A), the compressor system 28 (FIG. 2C), the storage system 30 (FIG. 2C), the engine control module 46 (FIG. 2C) on the vehicle 16 (FIG. 2C), and the audit and control module 88 (FIG. 2C) of the dispensing system 14 (FIG. 2C). In addition, the quality control segment 176 (FIG. 2C) of the master control system 44 (FIG. 2A) includes a quality specimen loop 170 (FIG. 2B) in flow communication with the buffer tank 146 (FIG. 2B) configured to extract and analyze quality control samples. The quality specimen loop 170 (FIG. 2B) also includes a pressure regulator 174 (FIG. 2B) and a regulating valve 172 (FIG. 2B). The master control system 44 (FIG. 2A) also includes a safety system 178 (FIG. 2A) configured to use pressure, temperature and flow data to insure safety.

The master control system 44 (FIG. 2A) includes computers or controllers programmed with software configured to achieve control of the system 10 including the producing system 12 and the dispensing system 14. In addition, the master control system 44 (FIG. 2A) operating in conjunction with the safety system 178 (FIG. 2A) provides a safety override system. In addition, the master control system 44 (FIG. 2A) provides quality assurance monitoring and control during blending and dispensing of the hydrogen enriched fuel. Further, the master control system 44 (FIG. 2A) has the capability to use any of the various forms of HYTHANE, although some of the components can be tailored to meet the specific needs of each type of fuel. The master control system 44 (FIG. 2A) also collects data, verifies parameters and performs real time computing of user configurable output parameters. In addition, the master control system 44 (FIG. 2A) performs certified auditing for different tradable emissions programs including carbon or NOx credits under the Kyoto Protocol.

Figure 3:
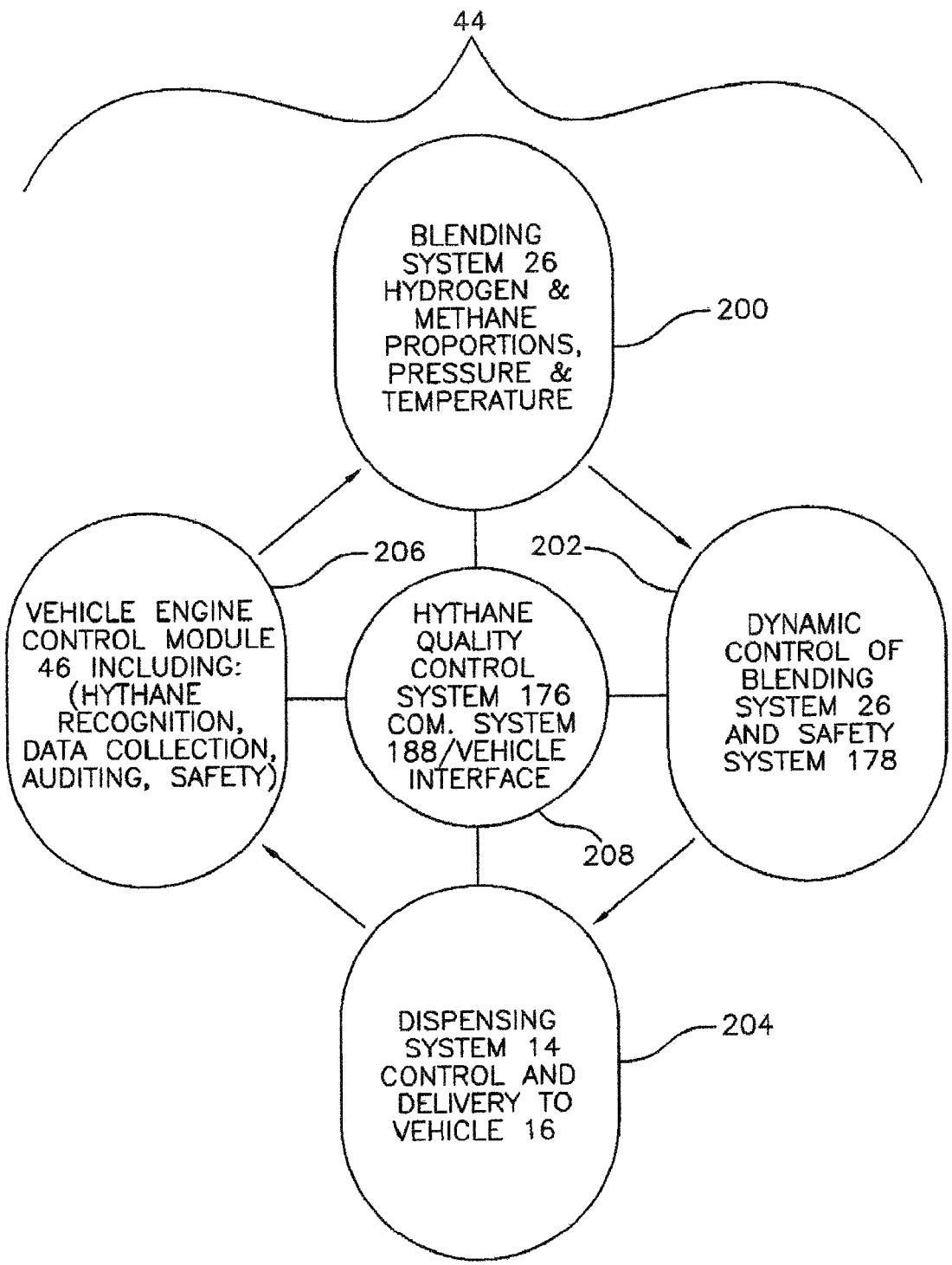
FIG. 3 is a schematic diagram of a master control system of the system.

Referring to FIG. 3, operational characteristics of the master control system 44 are illustrated in a flow diagram. As indicated by bubble 200, the blending system 26 is controlled to provide the constituents (e.g., hydrogen gas and methane) in an integrated, proportional mixture at a selected pressure and temperature. As indicated by bubble 202, dynamic control of the blending system 26 and control of the safety system 178 are provided. As indicated by bubble 204, the dispensing system 14 and delivery to the vehicle 16 are controlled. As indicated by bubble 208, the HYTHANE quality control system 176, and the communication system 188 to vehicle interface are controlled. As indicated by bubble 206, the vehicle engine control module 46 including HYTHANE recognition, data collection, audit and safety are controlled. Further details of the data collection and auditing functions of the master control system 44 will now be described.

Master Control System 44—Exhaust Emissions Data Collection and Audit

The 1997 Kyoto Protocol created market-based emissions trading mechanisms to help countries reduce the cost of meeting their greenhouse gas emissions reduction targets. In order to take advantage of the emissions credits generated by the use of HYTHANE, a properly validated and verified system is necessary to account for any reduction in carbon dioxide or equivalent greenhouse gas emissions. For local air quality control (not as part of the Kyoto Protocol), some areas also trade credits for reductions in NOx and SOx (oxides of sulfur) emissions.

Data Recorded at Dispensing System 14

The simplest way to track carbon dioxide emissions is to track overall fuel consumption of the vehicle fleet at the dispensing system 14. In this case, the dispensing system 14 can include the audit and control module 88 (FIG. 1) in signal communication with the engine control module 46 (FIG. 1) on the vehicle 16 (FIG. 1). If the composition of the fuel is known, then it is a straightforward calculation to determine the kilograms of carbon dioxide exhausted to the atmosphere for every kilogram of HYTHANE dispensed and ultimately combusted. However, as will be discussed in the Data Calculation and Reporting section, this method will only account for the actual carbon dioxide emissions, not any other possible greenhouse gas emissions or life cycle benefits.

Data Collected by On-Board Equipment

Access to on-board data enables tracking of not just fuel consumption, but fuel consumption at specific environmental and engine operating conditions. With well-characterized engine emissions behavior information, it is then possible to quantify all the engine emissions, not just carbon dioxide.

There is a spectrum of levels to which the data collection and distribution functions may be performed by the master control system 44 (FIG. 1) and the engine control module 46 (FIG. 1).

1. Sensor data can be collected, stored, and distributed to the master control system 44 (FIG. 1) by stand-alone on-board equipment.
2. Sensor data can be collected by the engine control module 46 (FIG. 1) and sent as a real-time data stream (through a typical SAE J1939 CAN bus, for instance) to the master control system 44 (FIG. 1).
3. Sensor data can be collected and stored by the engine control module 46 (FIG. 1) and occasionally sent to a stand-alone distribution unit to be broadcast to the master control system 44 (FIG. 1).
4. All of the data collection, storage, and communication functions are integrated into the engine control module 46 (FIG. 1).

The data stored on-board by the engine control module 46 (FIG. 1) may be transmitted by wire connection or wireless communication (e.g., communication system 188-FIG. 4) to the master control system 44 (FIG. 1). This data transmission process may occur during refueling at the dispensing system 14 (FIG. 1), or data may be collected directly by the vehicle fleet agency. For example, the engine control module 46 can be in signal communication via wireless communication with the audit and control module 88 (FIG. 1) on the dispensing system 14.

Data Calculation and Reporting

Simple carbon dioxide emissions reduction can be calculated from total fleet fuel consumption and fuel composition data. This method does not take advantage of additional equivalent greenhouse gases, like methane emissions, or potential life cycle benefits. This may leave a significant number of emissions reduction credits unaccounted for, since other gases, like methane, have a much stronger greenhouse effect.

The next level of data calculation and reporting adds histogrammatic information about the fuel consumption at various engine operating conditions; this data must be collected on-board the vehicles 16 (FIG. 1) in the fleet. This information can be used to calculate the total emissions of any of the exhaust constituents for each individual vehicle 16. Calculated data from all of the vehicles 16 in the fleet are then aggregated for reporting of carbon dioxide equivalent reductions. In addition, other gases may qualify for regional air quality emissions trading credits, like NOx and SOx.

Information about the fuel sources, refueling stations 34 (FIG. 1), and baseline vehicle fleet provides the final level of data needed for complete life cycle assessment of emissions reduction of the system 10 (FIG. 1). For instance, one station may receive natural gas from a pipeline (which could be a mixture of well gas and LNG transported by ship), while another station may use only LNG transported by ship and truck. The hydrogen sources are likely to be even more varied. In some cases, the baseline may be a fleet of natural gas buses converted to HYTHANE, while in other cases, an entire baseline fleet of diesel buses may be completely replaced by new HYTHANE units. The greenhouse gas emissions calculated over the entire life cycle is dependent on the path taken from "wells to wheels," and it is this total life cycle assessment which must be compared to the baseline as a valid method for reporting the total HYTHANE greenhouse gas emissions reduction.

Storage System 30

The pre-blended HYTHANE can be stored in the storage system 30 (FIG. 2C) for days at a time without venting, as long as the storage conditions maintain a supercritical state of the methane in the hydrogen gas. The downside to supercritical storage is that the tanks must be designed for both pressure and insulation (but not as much pressure as compressed gas storage and not as much insulation as cryogenic liquid storage).

Separate Storage

As another alternative to storing the blended HYTHANE in the storage system 30 (FIG. 2C) in a supercritical state, the hydrogen and methane can each be stored independently, as high pressure compressed gases or cryogenic liquids. One advantage of this approach is that the separate fuel source transportation tanks can also be used as refueling station storage containers until depleted. For example, hydrogen tube trailers can be parked at the refueling station, used up, and trucked back to the central distribution hub for another cycle.

When the refueling station 34 (FIG. 2C) is located relatively remotely from natural gas pipelines, LNG storage offers economical benefits, not just for transportation, but also for the production of LCNG, which is CNG (compressed natural gas) produced from pumped and vaporized LNG. LCNG can be produced from LNG on-the-fly during vehicle refueling, so no high pressure natural gas storage is required, only a small buffer tank. Separate storage of natural gas and hydrogen also allows separate dispensing of fuels, such that LNG, CNG, hydrogen, and HYTHANE vehicles could be refilled at one location. However, if only compressed hydrogen and CNG or LCNG is stored separately, then high pressure HYTHANE blending is necessary during compressed gas vehicle tank refueling, which may not be as simple and consistent as low pressure, pre-compressor HYTHANE blending.

Vehicle Storage

Like storage at the refueling station 34 (FIG. 2C), there are many options for HYTHANE storage in vehicles. One suitable method of vehicle storage configures the vehicle fuel tank 42 as a cryogenic vessel or dewar configured to store the pre-blended HYTHANE in a supercritical state. However, the method of storage at the refueling station 34 (FIG. 2C) combined with the method of storage in the vehicle 16 (FIG. 2C) places constraints on the methods available for dispensing blended HYTHANE to high pressure vehicle fuel tanks 42 (FIG. 2C).

Using HYTHANE, about 20% of the volume of the vehicle fuel tank 42 contains hydrogen, which has lower energy content per unit volume than methane. In addition, methane has favorable compressibility characteristics at higher pressures, whereas hydrogen's compressibility worsens as the pressure increases. The overall effect is that the range of a natural gas vehicle may be reduced by as much as 20% when it is converted to HYTHANE. This effect can be mitigated somewhat by the composition of the natural gas and its higher hydrocarbon content. With ethane, propane, and butane all saturated (non-condensing) in a tank of HYTHANE at 25 MPa (3600 psi) and 0° C., the volumetric energy density of the mixture is within 5% of a pure methane tank at the same conditions. In some situations in which range is a critical issue, intentionally 'spiking' the HYTHANE with higher hydrocarbons may be desirable.

As an alternative to the blending system 26 (FIG. 2) hydrogen gas and a supercritical methane fuel can mixed and compressed using a vortex mixer, as described in U.S. application Ser. No. 11/273,397, filed on Nov. 14, 2005, entitled "Method And System For Producing A Supercritical Cryogenic Fuel (SCCF)", which is incorporated herein by reference.

Dispensing System 14

Figure 4:
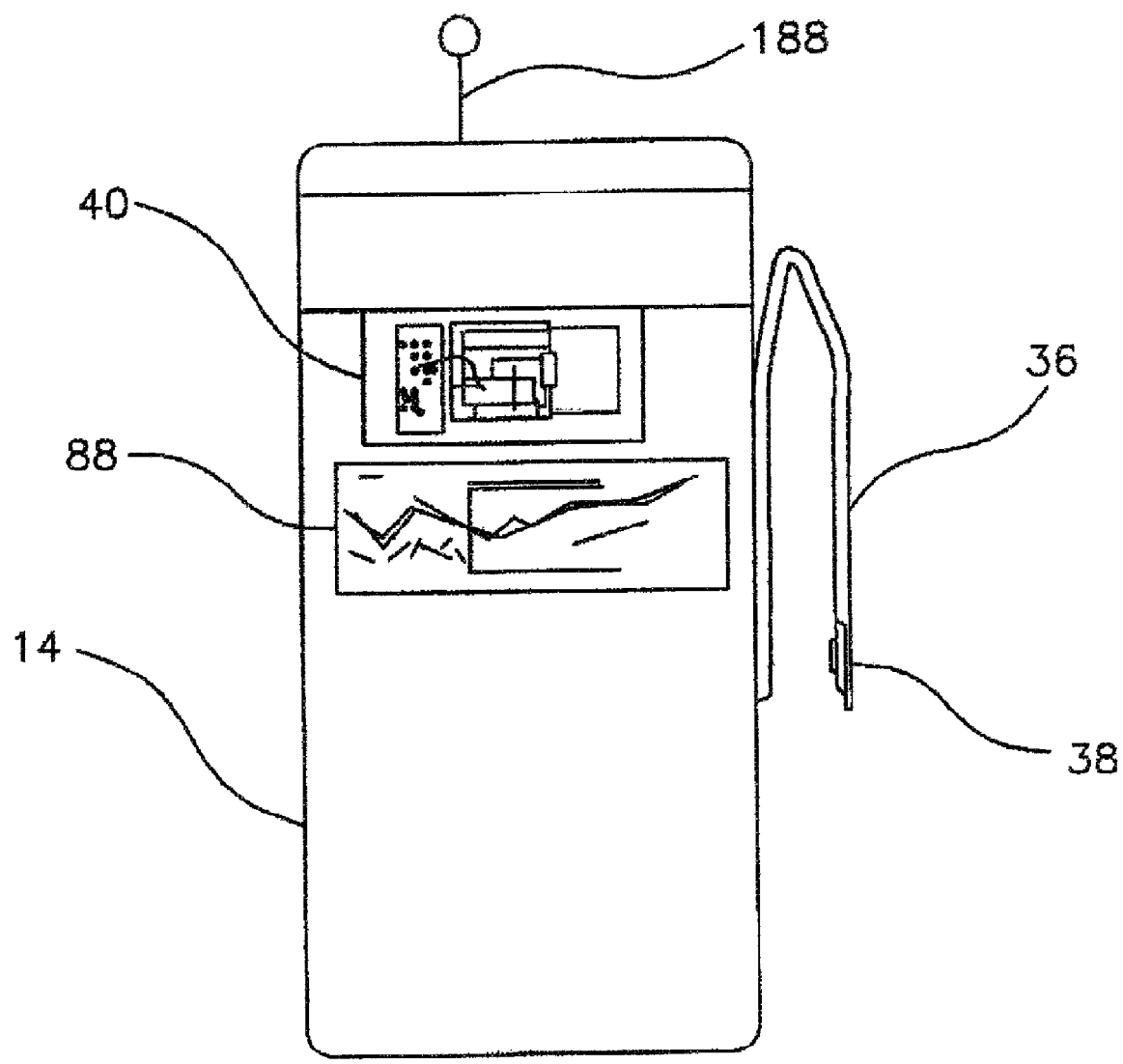
FIG. 4 is a schematic drawing of a dispensing system of the system.

Referring to FIG. 4, the dispensing system 14 is shown separately. The dispensing system 14 includes a hose 36 and a fill valve 38 adapted for sealed gas/fluid communication with the vehicle fuel tank 42 (FIG. 1) on the vehicle 16 (FIG. 1). The dispensing system 14 (FIG. 4) also includes various internal components 40 including metering, control, and switching components in combination with supporting solenoid valves, pressure gauges and safety related components. In addition, the components 40 can be configured for the specific HYTHANE fuel type to be dispensed. For high pressure gaseous HYTHANE, the set up of the components 40 can be similar to conventional CNG dispensers used in the existing natural gas vehicle market.

The dispensing system 14 can also include the previously described audit and control module 88 (FIG. 4). In addition to being in signal communication with the previously described communications lines 182 (FIG. 2C), the audit and control module 88 can be in signal communication with the signal communications system 188. The signal communications system 188 can comprise a wireless system, such as a RF (radio frequency) system, configured to transmit signals between the dispensing system 14 and other components of the system 10 (FIG. 1). For example, the communications system 188 can establish signal communication with the engine control module 46 (FIG. 1), and with the master control system 44 (FIG. 2A). Rather than a wireless system, the communications system 188 can comprise a hardwired connection or a card reader system.

Dispensing Separate CNG and Compressed Hydrogen to Mix in High Pressure Tanks

As mentioned in the storage section, the natural gas may be stored as low pressure LNG and only pumped to high pressure and vaporized during vehicle refueling. Another possibility is that compressed natural gas and compressed hydrogen are stored separately to preserve the flexibility to refuel CNG, hydrogen, or HYTHANE vehicles at one facility. In these cases, HYTHANE may have to be dispensed in alternating squirts, or aliquots, of compressed hydrogen and CNG to mix in the vehicle tanks. This complicates the dispensing of HYTHANE and may not provide mixtures as consistent as other HYTHANE blending methods.

Dispensing Separate Cryogenic Liquids or a Supercritical HYTHANE Mixture

Space-constrained or long-range vehicles may require the higher density of cryogenic fuel storage. Separate LNG and liquid hydrogen tanks could be used, but vehicle refueling then requires separate fuel connections and the HYTHANE blending must be done on-board the vehicle. Alternatively, a supercritical cryogenic HYTHANE blend can be pumped through one fuel connection and stored in one vehicle tank.

Dispensing Cryogenic Liquids or Compressed Gases to Separate Vehicle Tanks

In some unusual circumstances, it may be desirable to use a variable HYTHANE composition, or use either natural gas or hydrogen fuel exclusively during certain engine conditions, or at particular locations along the vehicle route. In these situations, it may be necessary to dispense and store the natural gas and hydrogen separately in the vehicle, either in cryogenic tanks, high-pressure gas tanks, or a combination.

Vehicle Delivery System 20

Once the fuel is on-board the vehicle 16 (FIG. 1), there are several options for the delivery of HYTHANE to the vehicle engine 18 (FIG. 1). There are also a variety of options for the way in which the HYTHANE is ultimately combusted within the vehicle engine 18 (FIG. 1).

Pre-Blended Delivery

In most cases, the HYTHANE can be stored as a pre-blended, compressed gas. Filters, electric solenoid lock-off valves, and pressure regulators and their associated plumbing connect the fuel tank 42 (FIG. 1) or tanks, with the fuel delivery system 20 (FIG. 1) and the engine control module 46 (FIG. 1) to deliver HYTHANE to the engine 18 (FIG. 1).

If HYTHANE is stored as a pre-mixed supercritical fuel, the tank pressures will be high enough to use the same delivery system 20 (FIG. 1) as the pre-mixed compressed gas example above. However, the supercritical HYTHANE mixture must be heated and vaporized as it leaves the vehicle fuel tank 42 (FIG. 1).

Likewise, if one of the HYTHANE fuel components is stored separately as a cryogenic liquid, the fuel must be heated and vaporized as it is removed from the fuel tank 42 (FIG. 1). In this case, however, pressure reduction regulators may not be necessary because the liquid tank is not usually kept at high pressures. Only filters, lock-off valves, and plumbing connect the tank and the engine fuel system.

Fuels Stored Separately HYTHANE Blended On-Board

When the hydrogen and natural gas are stored in the vehicle 16 (FIG. 1) separately, the HYTHANE must then be blended on-board. In order to achieve consistent HYTHANE blending ratios over the wide fuel flow range of the engine 18, special blending or delivery equipment is necessary.

One blending method is explained in U.S. Pat. No. 4,520,763 which is incorporated herein by reference. This blending method uses the compressibility of gases to achieve proportional flow between the air entering the engine 18 (FIG. 1) and the amount of fuel that is injected into it. Hydrogen Components, Inc. of Littleton, Colo., has used this technique, called "Constant Volume Injection" (CVI), for 25 years for controlling hydrogen engines. The same technique can be used for metering two or more gases in a precise, fixed proportion.

Figure 5:
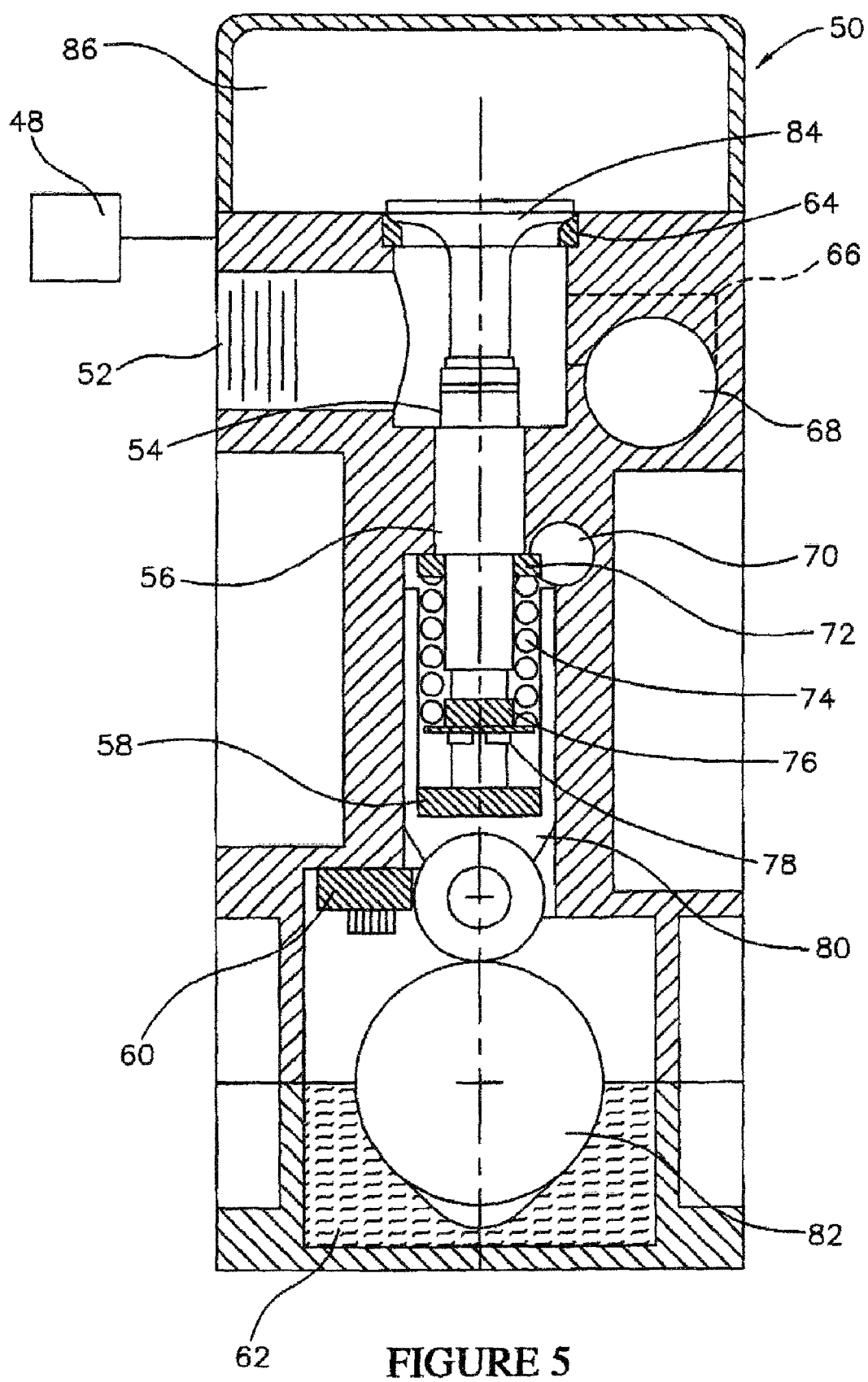
FIG. 5 is a cross sectional view of a system for blending hydrogen gas and a hydrocarbon fuel on board a vehicle engine.

Referring to FIG. 5, a CVI unit 50 is illustrated. The CVI unit 50 includes the following components.

52 exhaust port
54 valve seal
56 valve guide
58 shim
60 roller guide
62 lube oil
64 valve seat
66 intake port
68 intake manifold
70 vent passage
72 spring seat
74 spring
76 spring retainer
78 keepers
80 roller tappet
82 cam
84 exhaust valve
86 CVI chamber The cam 82, synchronized with the engine's camshaft, operates the CVI unit 50 in a 3-step sequence:

1. An intake valve (not shown) opens, allowing the hydrogen and methane fuels to fill their respective CVI chambers 86. There is a CVI chamber 86 for each gaseous fuel, one for hydrogen and one for methane (CNG).
2. A precisely measured quantity of hydrogen fuel is trapped in a CVI chamber 86 by closing the intake valve (not shown). Likewise, a corresponding quantity of methane fuel is trapped in it's respective CVI chamber 86.
3. The exhaust valve 84 opens and discharges the hydrogen and methane fuel gases into a fuel buffer volume (not shown) for mixing and delivery to the engine fuel control system 48.

The basic principle of operation is that a sealed chamber of precisely known volume at a controlled pressure and a fixed temperature holds a known amount of gas. The amount of gaseous fuel delivered by the CVI chamber 86 is proportional to engine RPM, the chamber volume, and the pressure difference between the inlet valve (not shown) and the exhaust valve 84. The objective of blending 7% hydrogen by energy content requires about 20% hydrogen by volume in natural gas. In ideal gas theory, the volume of a chamber 86 used for natural gas should be 4 times larger than the volume of a chamber 86 used for hydrogen to yield an 80/20% mix. Test results have shown that the theoretical chamber volumes need to be modified slightly for real gas behavior. As long as the natural gas and hydrogen are supplied to the CVI unit 50 at the same pressure, and the two chambers 86 discharge to the same buffer volume, the fuel mixture composition will be maintained at a constant ratio. It is also possible to use a sensor to verify the final fuel mixture composition in this buffer volume.

Fuels Stored Separately and Delivered to Engine Separately with Parallel Fuel Systems Parallel fuel control systems may also be used for delivering hydrogen and natural gas to an engine in a precise, known ratio. If the open-loop fuel delivery characteristics are known for the fuel metering components over the whole operating range, such as well-characterized fuel injectors, then the natural gas and hydrogen can be metered separately to finally mix at the engine intake or within the engine cylinder. Although two separate sets of fuel metering components are used, they may both be driven by one engine control module.

In most cases, a constant HYTHANE composition is used, and the engine calibration is optimized for this specific mixture. However, in some circumstances, it may be advantageous to be able to operate on either HYTHANE or natural gas only, depending on fuel availability. With on-board HYTHANE blending, the hydrogen fuel delivery system can be shut off, and a fuel control system 48 (FIG. 5) can use dual calibration tables to accommodate either NG-only or HYTHANE fuel supplies. To take the fuel system flexibility one step further, it is also possible for the fuel control system 48 (FIG. 5) to sense the incoming fuel hydrogen content and compensate for variable HYTHANE composition. With separate hydrogen and natural gas vehicle storage, it is even possible to actively control the fuel mixture and provide natural gas only, hydrogen only, or any mixture in between for different engine operating conditions or vehicle route locations.

HYTHANE Engine Operation

There are basically two modes of engine operation used for vehicle engine operation, lean burn and stoichiometric. Depending on the priorities and emissions goals, HYTHANE may be used with either engine type to improve combustion stability, increase power and efficiency, and reduce harmful exhaust emissions.

Operating an engine at lean air/fuel ratios generally improves efficiency. However, the power is reduced, so a turbocharger is usually added to increase airflow and power. By providing higher intake pressure and utilization of waste exhaust gas energy, the turbo also further improves efficiency. Maximum efficiency is constrained by flammability as the air/fuel ratio goes leaner and by knock as the intake pressure is increased. NOx emissions reduction is also limited by the lean flammability limit, where unburned hydrocarbon (methane) emissions dramatically increase. The addition of hydrogen to a natural gas engine operating close to the lean flammability limit, with no other calibration changes, will increase NOx, increase power, increase efficiency, and reduce unburned hydrocarbons. However, the hydrogen also improves the fuel flammability and allows leaner operation and reduced ignition timing. These calibration parameters can be optimized for higher efficiency, higher power, or reduced NOx emissions without an increase in unburned hydrocarbons. The most economical way to reduce hydrocarbon emissions dramatically is with the use of an oxidation catalyst, however the stable methane molecules require relatively high exhaust temperatures for effective catalysis. Many research and demonstration projects have determined that a hydrogen content of 7% by energy in HYTHANE is optimum for the reduction of NOx (by about 50% vs. NG), without any penalty in efficiency, power, or hydrocarbon emissions. More hydrogen will allow leaner operation, but lower NOx is not possible without a sacrifice in efficiency, power, or hydrocarbon emissions (due to lower exhaust temperatures in the oxidation catalyst at leaner conditions).

Stoichiometric Combustion

A chemically balanced air/fuel mixture is referred to as a 'stoichiometric' air/fuel ratio. Natural gas engines operating at this condition provide maximum power, but efficiency and engine-out emissions are worse than lean burn operation. In addition, exhaust temperatures are at a maximum during stoichiometric combustion at full load, and many heavy-duty diesel-derivative engines are not designed for these high temperatures and heat loads.

Despite these apparent shortcomings, most light-duty gasoline engines are stoichiometric, and many heavy-duty engines are currently being developed for this type of operation. The key enabling technology for stoichiometric engines is the three-way exhaust catalyst. This device reduces NOx emissions and uses its oxygen, along with oxygen left over from incomplete combustion in the engine, to also oxidize carbon monoxide (CO) and unburned hydrocarbons (HC). The overall level of post-catalyst emissions can be an order of magnitude lower than even lean-burn combustion with natural gas. Although the emissions levels are already very low for stoichiometric, catalyzed natural gas engines, HYTHANE can still improve the emissions significantly. Hydrogen stimulates the combustion of methane and is a powerful reducing agent for NOx and unreacted oxygen. As little as 5% hydrogen by energy has been demonstrated to reduce NOx and CO by more than 50% and total hydrocarbon emissions by 35% in a stoichiometric CNG light-duty vehicle with three-way catalysis.

Lower efficiency and high temperatures are the undesirable characteristics of stoichiometric combustion to be improved for heavy-duty engines. Both of these issues can be mitigated with the use of exhaust gas recirculation (EGR). Like lean-burn operation, EGR increases efficiency but sacrifices power; so again, turbocharging is frequently used to improve the engine's power density. For the most part, lean-burn engines reduce exhaust temperatures and NOx by reducing combustion temperatures by diluting the air/fuel charge with excess air. EGR accomplishes the same effect but reduces NOx even further because the recycled exhaust has little or no oxygen. In any case, any engine-out NOx is almost completely eliminated in the catalyst when a stoichiometric air/fuel ratio is used. Like lean-burn engines, stoichiometric EGR engines benefit from the addition of hydrogen because additional EGR can be used before the dilution flammability limit of the mixture causes misfire. This increases efficiency and lowers exhaust temperatures and engine-out NOx emissions. In addition, the use of EGR still allows the benefits of hydrogen with stoichiometric three-way catalysis to be realized, such as combustion stimulation and high catalytic reactivity at relatively low temperatures. For heavy-duty applications, stoichiometric turbocharged engines using EGR and three-way catalysts provide the lowest possible emissions with HYTHANE fuel, but at higher cost than lean-burn operation due to the expense and complexity of the EGR system and slightly lower efficiency.

Figure 6:
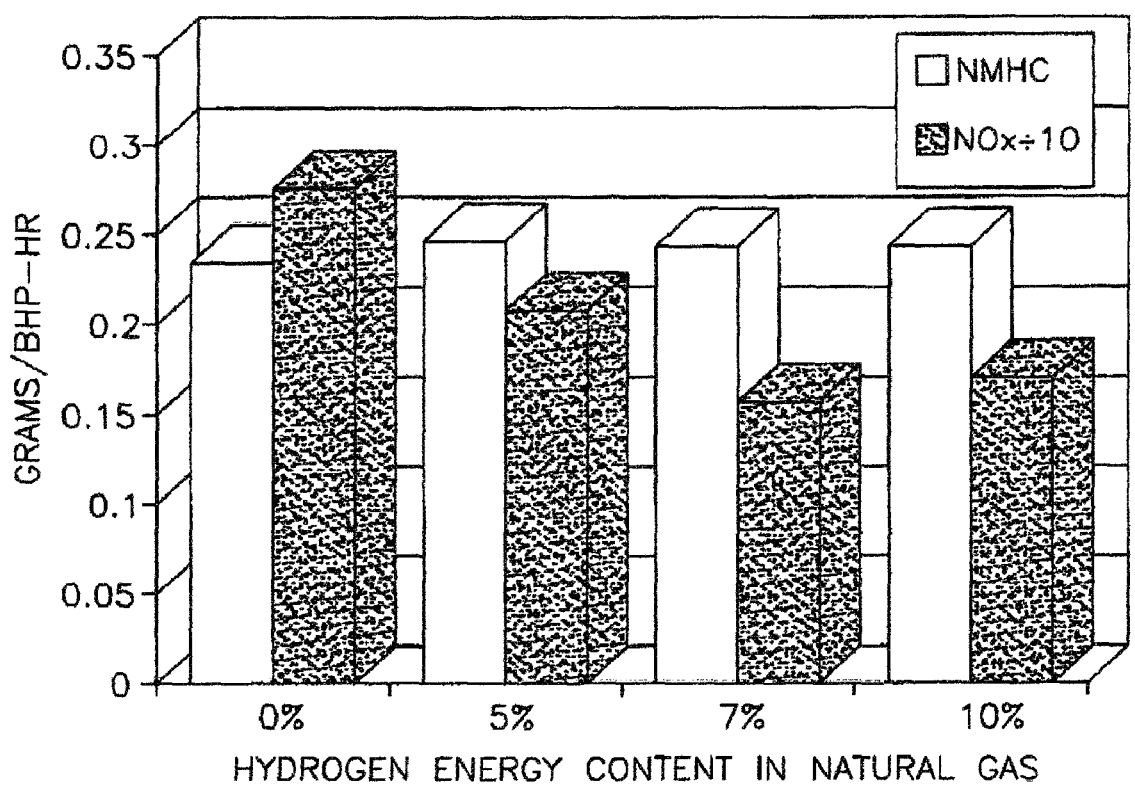
FIG. 6 is a graph showing the effect of various hydrogen concentrations on NOx emissions from a modified Cummins L-10 bus engine in a steady state simulation of the Federal emissions test.

HYTHANE bus fuel is a blend of 7% hydrogen by energy content in natural gas (20% $H_2$ by volume). FIG. 6 shows the effect of various hydrogen concentrations on NOx emissions from a modified Cummins L-10 bus engine in a steady state simulation of the Federal emissions test.

Thus the invention provides an improved system and method for producing, dispensing, using and monitoring the life cycle emissions of a hydrogen enriched fuel. While the invention has been described with reference to certain preferred embodiments, as will be apparent to those skilled in the art, certain changes and modifications can be made without departing from the scope of the invention as defined by the following claims.

What is claimed is:

1. A system for producing a hydrogen enriched fuel comprising:
    a hydrogen source configured to supply hydrogen and a hydrocarbon source configured to supply a hydrocarbon;
    a heat exchanger in flow communication with the hydrogen source and the hydrocarbon source configured to cool the hydrogen and the hydrocarbon to a selected temperature;
    a blending system comprising a mixing chamber in flow communication with the heat exchanger configured to mix the hydrogen and the hydrocarbon into the hydrogen enriched fuel;
    a buffer tank in flow communication with the mixing chamber configured to collect and temporarily store the hydrogen enriched fuel;
    a compressor system in flow communication with the buffer tank configured to pressurize the hydrogen enriched fuel to a selected pressure;
    a storage system in flow communication with the compressor system configured to store a selected quantity of the hydrogen enriched fuel at the selected pressure;
    a dispensing system in flow communication with the storage system configured to dispense the hydrogen enriched fuel into a vehicle; and
    a control system configured to control a flow of the hydrogen and the hydrocarbon into the mixing chamber, a flow of the hydrogen enriched fuel from the mixing chamber to the storage system, a flow of the hydrogen enriched fuel from the storage system to the dispensing system, and a flow of the hydrogen enriched fuel from the dispensing system to the vehicle;
    the control system configured to perform certified auditing for a tradable emission program.

2. The system of claim 1 further comprising a recycle loop in flow communication with the storage system and with the buffer tank configured to recycle the hydrogen enriched fuel from the storage tank to the buffer tank.

3. The system of claim 1 further comprising a quality specimen loop in flow communication with the buffer tank configured to extract a sample of the hydrogen enriched fuel.

4. The system of claim 1 wherein the control system is configured to provide quality assurance of the hydrogen enriched fuel during operation of the mixing chamber and during dispensing from the dispensing system.

5. The system of claim 1 wherein the control system is configured to control flow of the hydrogen and the hydrocarbon to the mixing chamber to provide an integrated, proportional mixture at a selected pressure and temperature.

6. The system of claim 1 wherein the control system is configured to collect data, verify parameters and perform real time computing of user configurable output parameters.

7. The system of claim 1 further comprising an engine control module on the vehicle in flow communication with the control system.

8. The system of claim 1 further comprising a safety system in signal communication with the control system configured to monitor safety of the blending system, the compressor system, the storage system and the blending system.

9. The system of claim 1 wherein the storage system is configured to store the hydrogen enriched fuel as a pre-blended pressurized gas or a cryogenic fluid in a supercritical state.

10. The system of claim 1 wherein the heat exchanger comprises a parallel flow heat exchanger.

11. The system of claim 1 wherein the hydrocarbon comprises methane or natural gas and the hydrogen enriched fuel comprises about 5% to 7% hydrogen by energy.

12. The system of claim 1 wherein the selected pressure is between about 2000 psig to 5000 psig.

13. The system of claim 1 wherein all components of the system are located at a vehicle refueling station.

14. The system of claim 1 wherein the storage system comprises a cascade of storage tanks.

15. The system of claim 1 wherein the hydrocarbon is selected from the group consisting of methane, ethylene, ethane, propane, propylene, propene and butane.

16. A system for producing a hydrogen enriched fuel comprising:
   a hydrogen source configured to supply hydrogen and a hydrocarbon source configured to supply a hydrocarbon;
   a blending system comprising a mixing chamber in flow communication with the heat exchanger configured to mix the hydrogen and the hydrocarbon into the hydrogen enriched fuel;
   a compressor system in flow communication with the blending system configured to pressurize the hydrogen enriched fuel to a selected pressure;
   a storage system in flow communication with the compressor system configured to store a selected quantity of the hydrogen enriched fuel at the selected pressure;
   a dispensing system in flow communication with the storage system configured to dispense the hydrogen enriched fuel into a vehicle having an engine control module, the dispensing system comprising an audit and control module in signal communication with the engine control module; and
   a control system in signal communication with the audit and control module on the dispensing system and in signal communication with the engine control module on the vehicle configured to control dispensing of the hydrogen enriched fuel by the dispensing system, and to store emission data during use of the hydrogen enriched fuel by the vehicle.

17. The system of claim 16 wherein the control system is configured to quantify air quality trading credits using the emission data.

18. The system of claim 16 further comprising a buffer tank in flow communication with the mixing chamber configured to collect and temporarily store the hydrogen enriched fuel.

19. The system of claim 16 further comprising a heat exchanger in flow communication with the hydrogen source and the hydrocarbon source configured to cool the hydrogen and the hydrocarbon to a selected temperature.

20. The system of claim 16 wherein the control system is configured to control a flow of the hydrogen and the hydrocarbon into the mixing chamber, a flow of the hydrogen enriched fuel from the mixing chamber to the storage system, a flow of the hydrogen enriched fuel from the storage system to the dispensing system, and a flow of the hydrogen enriched fuel from the dispensing system to the vehicle.

21. The system of claim 16 wherein the control system is configured to provide quality assurance of the hydrogen enriched fuel during operation of the mixing chamber and during dispensing from the dispensing system.

22. The system of claim 16 wherein the control system is configured to control flow of the hydrogen and the hydrocarbon to the mixing chamber to provide an integrated, proportional mixture at a selected pressure and temperature.

23. The system of claim 16 wherein the control system is configured to collect data, verify parameters and perform real time computing of user configurable output parameters.

24. The system of claim 16 wherein all components of the system are located at a vehicle refueling station.

25. The system of claim 16 further comprising a plurality of vehicles having a plurality of engine control modules in signal communication with the audit and control module.

* * * * *